United States Patent [19]

Kosemura et al.

[11] Patent Number: 5,187,574
[45] Date of Patent: Feb. 16, 1993

[54] METHOD FOR AUTOMATICALLY ADJUSTING FIELD OF VIEW OF TELEVISION MONITOR SYSTEM AND APPARATUS FOR CARRYING OUT THE SAME

[75] Inventors: Katsura Kosemura, Atsugi; Kazuyuki Yamamoto, Tokyo, both of Japan

[73] Assignees: Kanda Tsushin Kogyo Co., Ltd.; Nippon Telegraph and Telephone Corporation, Tokyo, Japan

[21] Appl. No.: 747,973

[22] Filed: Aug. 21, 1991

[30] Foreign Application Priority Data

Aug. 24, 1990 [JP] Japan .................................. 2-223344

[51] Int. Cl.5 .............................................. H04N 7/18
[52] U.S. Cl. .................................. 358/108; 358/222; 382/2
[58] Field of Search ............... 358/125, 105, 136, 126, 358/222, 108; 382/2, 16

[56] References Cited

U.S. PATENT DOCUMENTS

| | | | |
|---|---|---|---|
| 4,703,347 | 10/1987 | Yasuda et al. | 358/108 X |
| 4,951,140 | 8/1990 | Ueno et al. | 358/105 X |
| 4,996,594 | 2/1991 | Muriyama | 358/136 |
| 5,012,522 | 4/1991 | Lambert | 358/105 |
| 5,086,480 | 2/1992 | Sexton | 358/126 X |

*Primary Examiner*—Victor R. Kostak
*Attorney, Agent, or Firm*—Parkhurst, Wendel & Rossi

[57] ABSTRACT

A television doorphone apparatus in which an image of a quest is picked-up by a television camera provided on an outer wall of an entrance of a house, an image signal generated by the television camera and representing a whole image is processed to generate an enlarged image including the head of the guest, and the enlarged image is displayed on a monitor screen. In order to produce the enlarged image, at first a top center of the head of the guest is detected by comparing a relevant detection image with a previous detection image, the detecting image being constructed by smaller number of pixels than the image signal. Then, a start address of the enlarged image having a smaller size than the whole image is derived from the detected top center position of the head of the guest. Next, the pixel data of the enlarged image is extracted from the image signal, and finally the extracted enlarged pixel data is interpolated. In this manner, the head of the guest is always displayed at the center of the monitor screen.

16 Claims, 7 Drawing Sheets

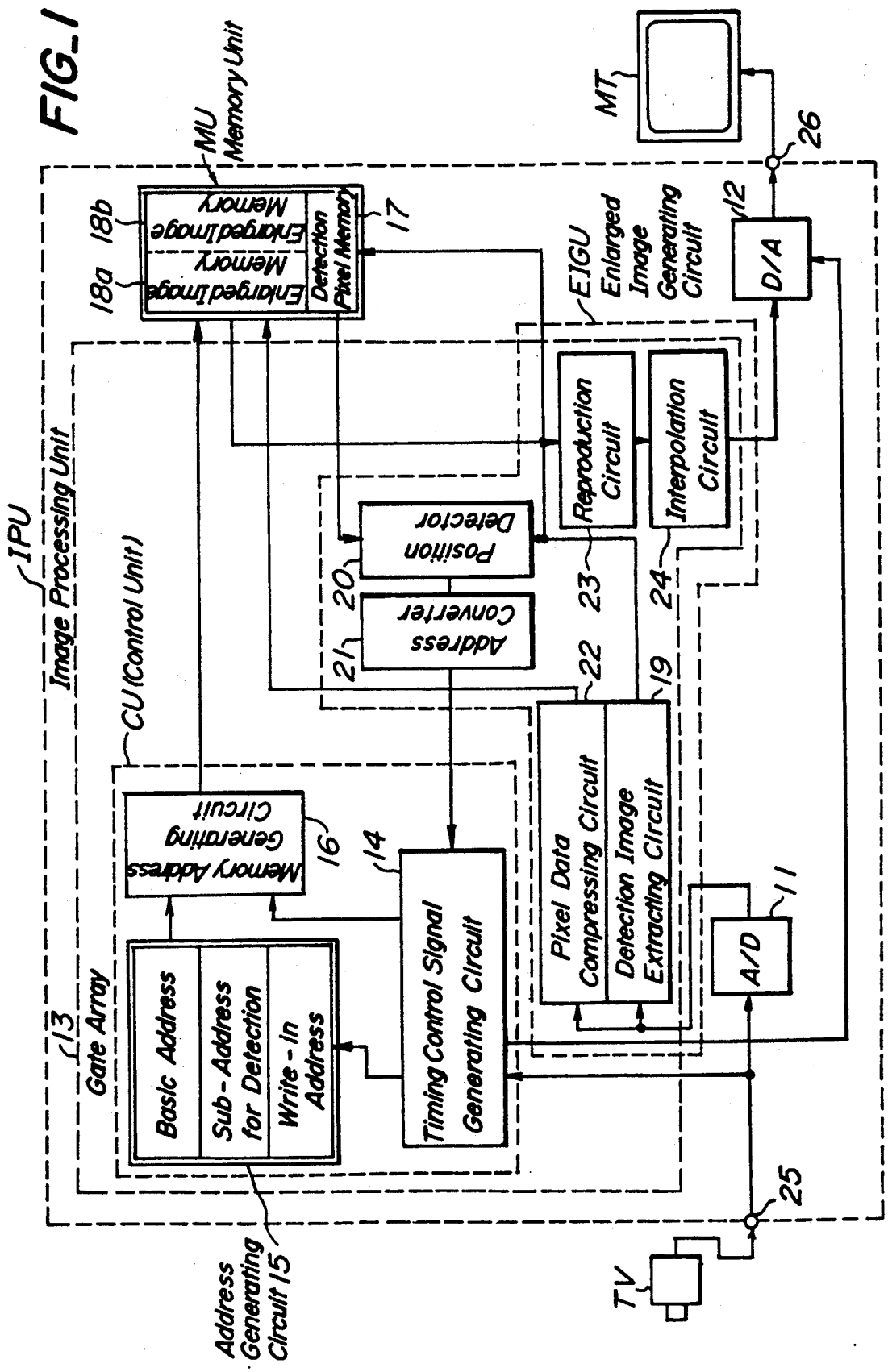

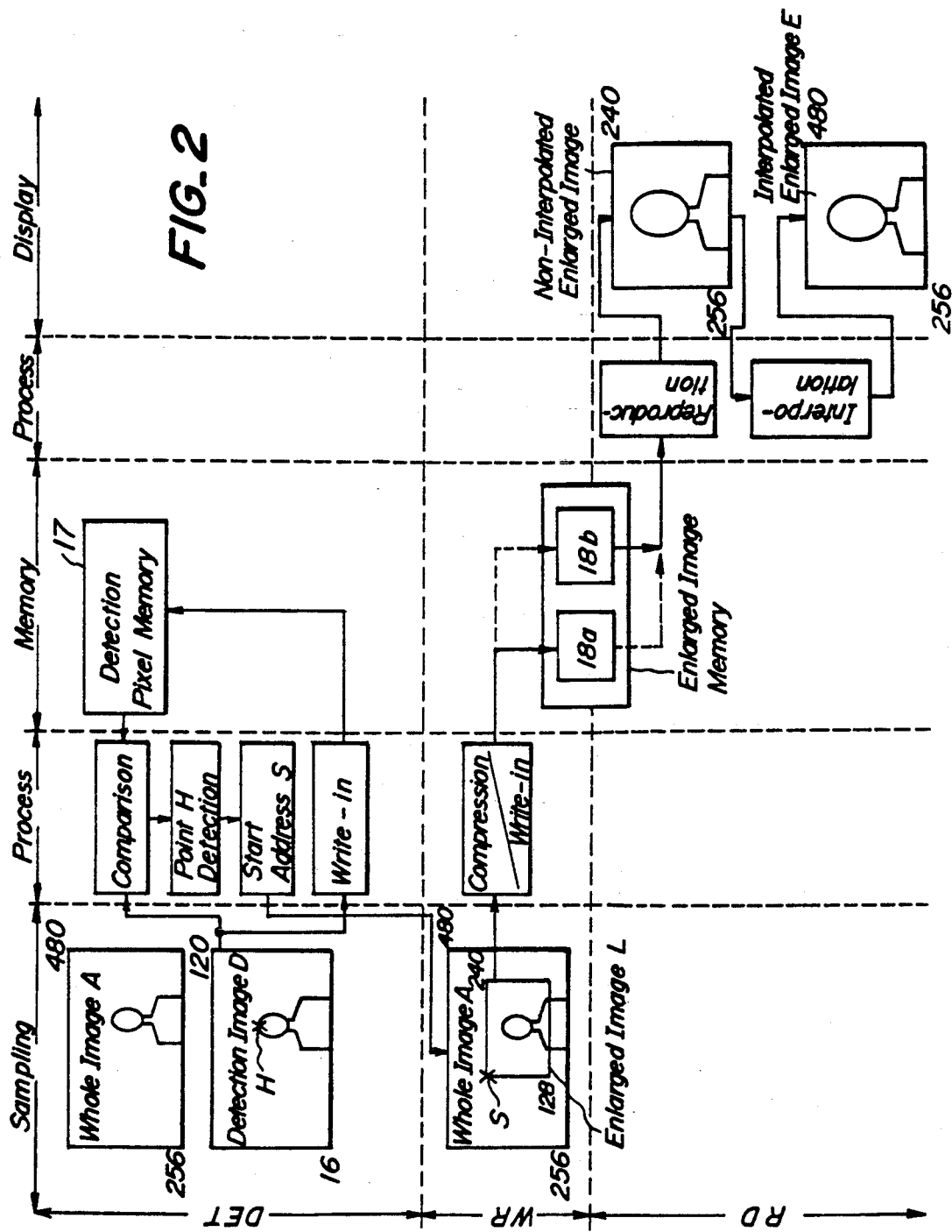

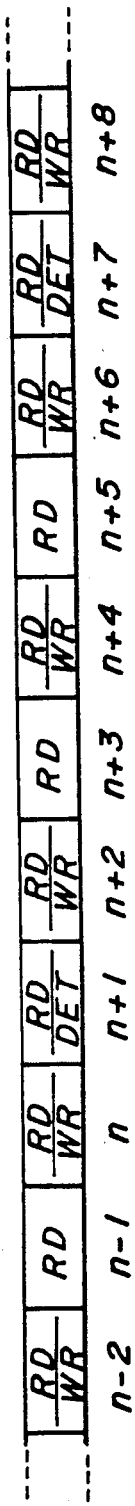
FIG._3

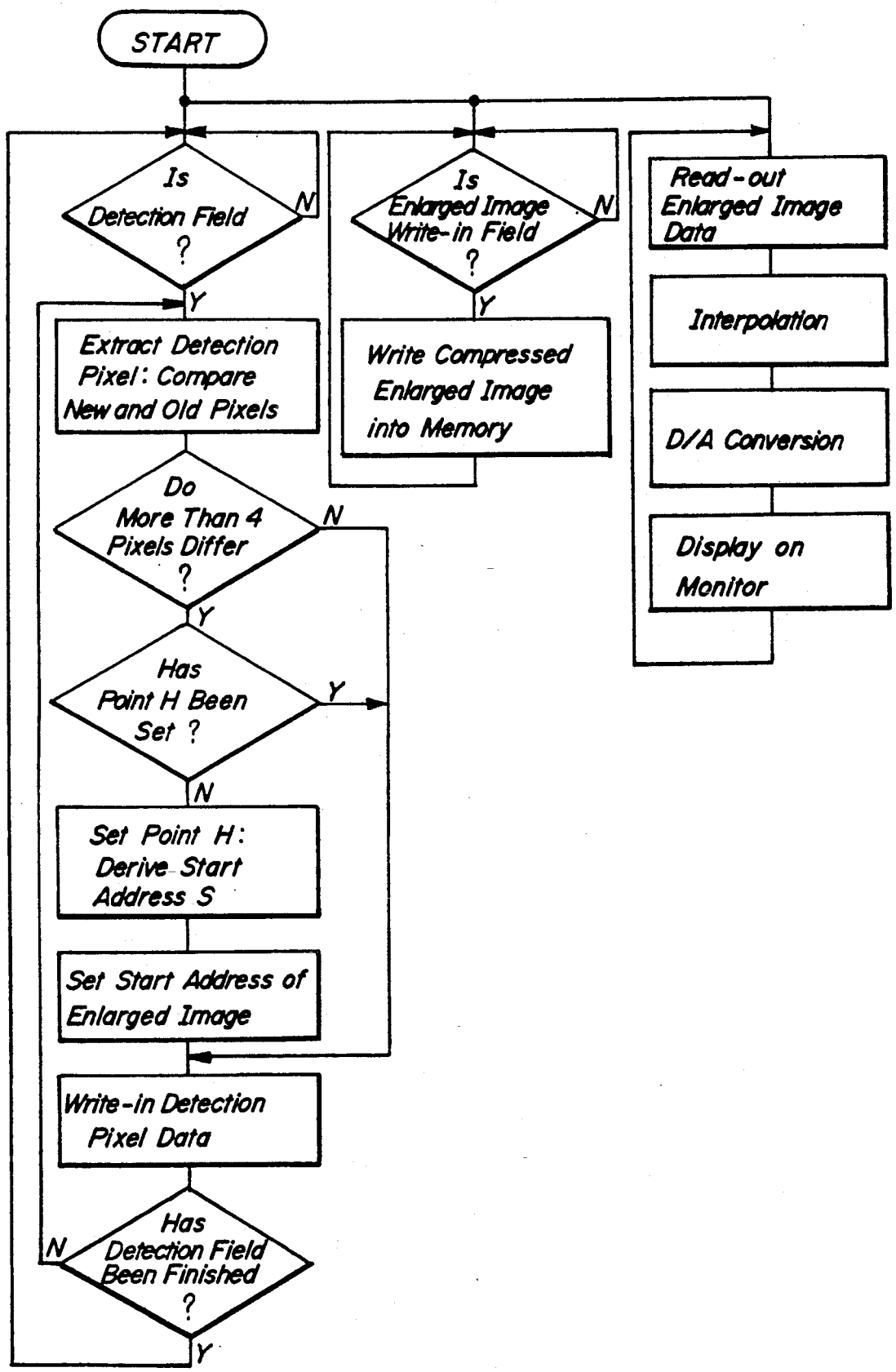
FIG_4

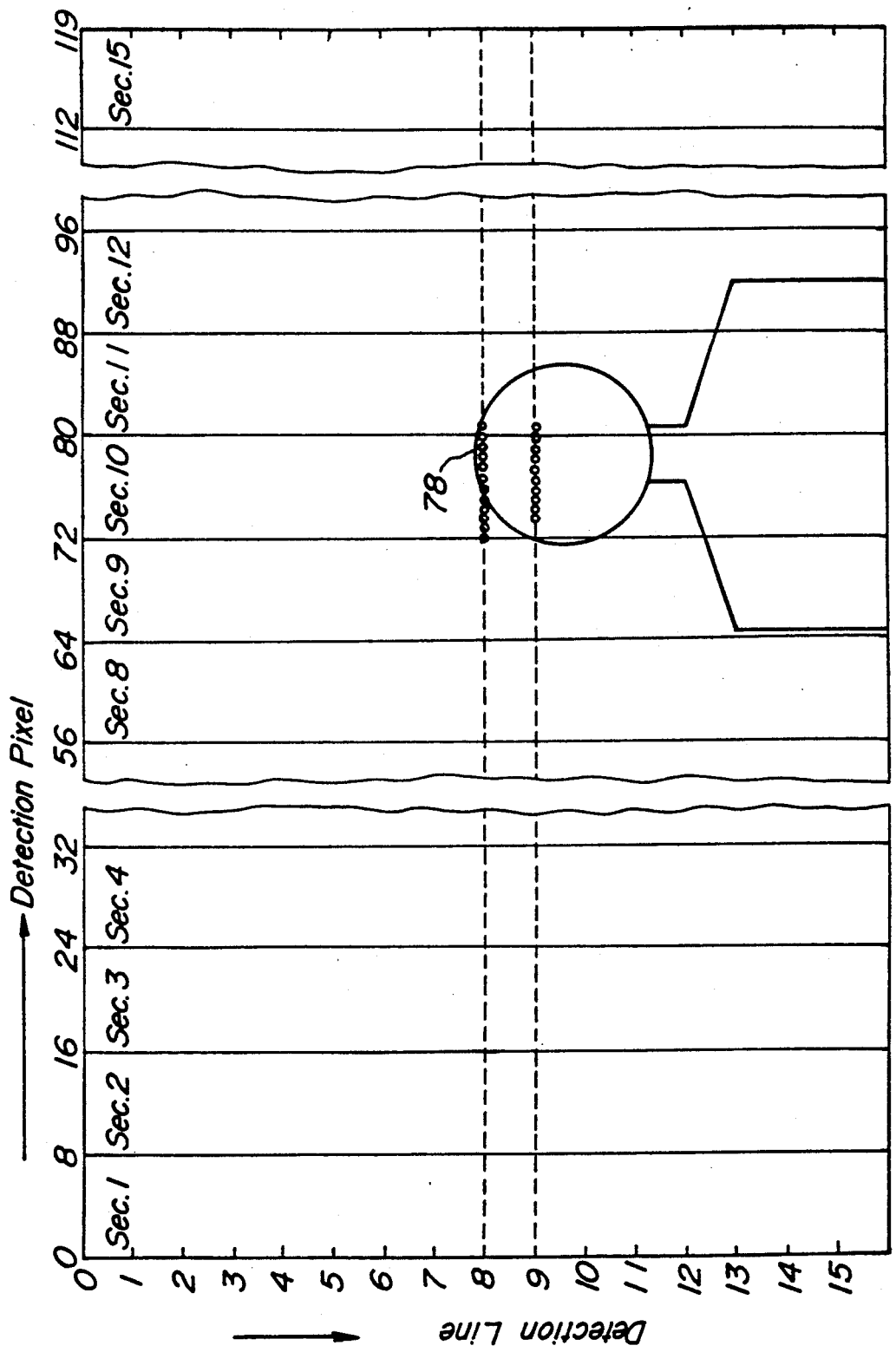

FIG_6
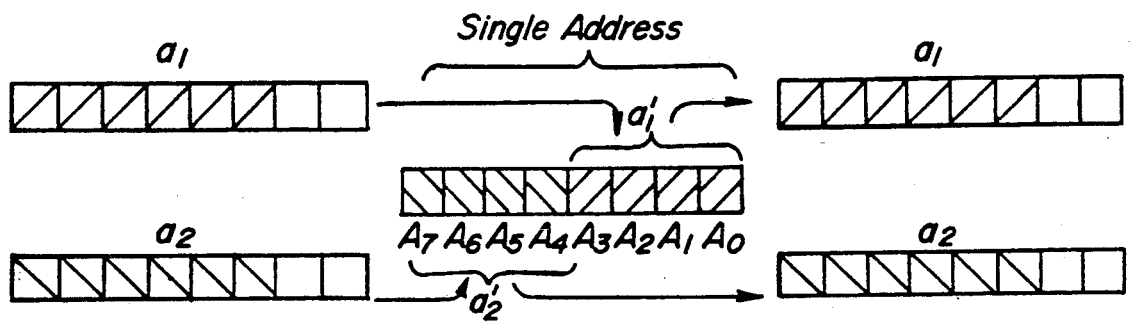
FIG_7
| Pixel No. / Line No. | 0 | 1 | 2 | | 119 |
|---|---|---|---|---|---|
| 0 | $a'_1\ a'_2$ | $a'_3\ a'_4$ | $a'_5\ a'_6$ | | $a'_{239}\ a'_{240}$ |
| 1 | $b'_1\ b'_2$ | $b'_3\ b'_4$ | $b'_5\ b'_6$ | | $b'_{239}\ b'_{240}$ |
| 2 | $c'_1\ c'_2$ | $c'_3\ c'_4$ | $c'_5\ c'_6$ | | $c'_{239}\ c'_{240}$ |
| 127 | $n'_1\ n'_2$ | $n'_3\ n'_4$ | $n'_5\ n'_6$ | | $n'_{239}\ n'_{240}$ |

FIG.8A

| Pixel No. / Line No. | 0 | 1 | 2 | 3 | 4 | 5 | ... | 239 |
|---|---|---|---|---|---|---|---|---|
| 0 | $a_1$ | $a_2$ | $a_3$ | $a_4$ | $a_5$ | $a_6$ | | $a_{240}$ |
| 1 | $a_1$ | $a_2$ | $a_3$ | $a_4$ | $a_5$ | $a_6$ | | $a_{240}$ |
| 2 | $b_1$ | $b_2$ | $b_3$ | $b_4$ | $b_5$ | $b_6$ | | $b_{240}$ |
| 3 | $b_1$ | $b_2$ | $b_3$ | $b_4$ | $b_5$ | $b_6$ | | $b_{240}$ |
| ... | | | | | | | | |
| 254 | $n_1$ | $n_2$ | $n_3$ | $n_4$ | $n_5$ | $n_6$ | | $n_{240}$ |
| 255 | $n_1$ | $n_2$ | $n_3$ | $n_4$ | $n_5$ | $n_6$ | | $n_{240}$ |

FIG.8B

| Pixel No. / Line No. | 0 | 1 | 2 | 3 | 4 | 5 | 6 | 7 | 8 | 9 | 10 | ... | 479 |
|---|---|---|---|---|---|---|---|---|---|---|---|---|---|
| 0 | $a_1$ | $a_{12}$ | $a_2$ | $a_{23}$ | $a_3$ | $a_{34}$ | $a_4$ | $a_{45}$ | $a_5$ | $a_{56}$ | $a_6$ | | $a_{240}$ |
| 1 | $a_1$ | $a_{12}$ | $a_2$ | $a_{23}$ | $a_3$ | $a_{34}$ | $a_4$ | $a_{45}$ | $a_5$ | $a_{56}$ | $a_6$ | | $a_{240}$ |
| 2 | $b_1$ | $b_{12}$ | $b_2$ | $b_{23}$ | $b_3$ | $b_{34}$ | $b_4$ | $b_{45}$ | $b_5$ | $b_{56}$ | $b_6$ | | $b_{240}$ |
| 3 | $b_1$ | $b_{12}$ | $b_2$ | $b_{23}$ | $b_3$ | $b_{34}$ | $b_4$ | $b_{45}$ | $b_5$ | $b_{56}$ | $b_6$ | | $b_{240}$ |
| 4 | $c_1$ | $c_{12}$ | $c_2$ | $c_{23}$ | $c_3$ | $c_{34}$ | $c_4$ | $c_{45}$ | $c_5$ | $c_{56}$ | $c_6$ | | $c_{240}$ |
| ... | | | | | | | | | | | | | |
| 255 | $n_1$ | $n_{12}$ | $n_2$ | $n_{23}$ | $n_3$ | $n_{34}$ | $n_4$ | $n_{45}$ | $n_5$ | $n_{56}$ | $n_6$ | | $n_{240}$ |

METHOD FOR AUTOMATICALLY ADJUSTING FIELD OF VIEW OF TELEVISION MONITOR SYSTEM AND APPARATUS FOR CARRYING OUT THE SAME

BACKGROUND OF THE INVENTION

Field of the Invention and Related Art Statement

The present invention generally relates to a method for automatically adjusting a field of view of a television monitor system including a television camera and a display monitor, and more particularly to a door vision system having a television camera provided at an entrance of a house and a display monitor provided within the house, in which an image of a head of a guest who stands in front of an entrance door can be automatically displayed at a center of a display screen of the display monitor in a simple and less expensive manner.

In the door vision system generally called a television doorphone apparatus, a television camera is fixedly arranged on an outer wall of an entrance, so that the field of view of the television camera is also fixed. Upon arranging the television camera, an objective lens of the television camera is manually adjusted such that a head of a guest having an average height and standing at a usual position on a center line of the field of view of the television camera is displayed at a center of a monitor screen. However, a relative position of the head of the guest and the television camera is not fixedly determined. For instance, the height of the guests varies widely and further the guests might stand closer to or far away from the television camera or might stand on the right or left hand side with respect to the center line of the field of view of the television camera. Therefore, in the known television doorphone apparatus, it is not guaranteed that the head of the guest is always displayed at the center of the monitor screen.

In order to avoid the above mentioned problem, it is considered that the television camera or at least its objective lens is moved by a remote control such that the face of the guest is displayed at the center of the display screen. However, it is apparent that this solution is very expensive. Further, the operation of a user for moving the television camera or objective lens is very cumbersome.

In Japanese Patent Application No. 58-177,962, there is disclosed a known television system, in which a subject of an object displayed on a monitor screen is indicated manually by a user and then the subject is automatically traced in accordance with a brightness level of the subject. This solution is not a fully automated one and requires the manual operation of the user.

In Japanese Patent Application No. 60-289,873, there is also proposed another known television system, in which an image signal generated by a television camera is once stored in a frame memory and a difference between image signals of successive fields is derived. Then, the thus derived difference is processed to detect a contour of the head of the guest. However, this publication does not describe any concrete method or apparatus for finding the contour of the head.

It is considered that the image signal is processed by a central processing unit (CPU) in accordance with a program to find a position of the guest on the basis of pictorial characteristics and a part of the image is extracted from the picked-up image in accordance with the thus detected position of the guest. However, this solution has a drawback that the image processing operation for extracting the image of the head of the guest by using an algorithm for extracting the pictorial characteristics of the guest is very complicated and a very large amount of data has to be treated. Further, this solution requires high speed signal processing circuits and large scale memory.

SUMMARY OF THE INVENTION

The present invention has for its object to provide a novel and useful method and apparatus for automatically adjusting a field of view of a television camera such that a subject of an object is always displayed at a center of a display screen in a simple and less expensive manner.

It is another object of the invention to provide a novel television doorphone apparatus in which a head of a guest can be always displayed at a center of a monitor screen in regardless of the height and standing position of the guest relative to a television camera.

According to the invention, a method of automatically adjusting a field of view of a television monitor system including a television camera for picking-up an image of an object to generate an image signal representing a whole image, an image processing unit for processing the image signal generated by the television camera to produce a processed image signal, and a monitor for receiving the processed image signal and displaying the image of the object on a monitor screen, comprises the steps of:

extracting detection pixels which represents a detection image, from said whole image by sampling the image signal on every n-th lines (n is larger than two);

storing said detection pixels in a detection pixel memory;

comparing detection pixels of a relevant detection image and corresponding detection pixels of a previous detection image which are stored in said detection pixel memory;

detecting an occasion in which more than predetermined number of successive pixels of the relevant detection image differ from corresponding detection pixels of the previous detection image over a predetermined amount to detect a position of a center top of the image of the object; and generating a start address of an enlarged image in accordance with said position of the center top of the object.

According to another aspect of the invention, a television doorphone apparatus comprising a television camera provided on an outer wall of an entrance of a house for picking-up an image of a guest who stands in front of the television camera to generate an image signal, an image processing unit for processing the image signal generated by the television camera to produce a processed image signal, and a monitor for receiving the processed image signal and displaying the image of the guest on a monitor screen, the improvement being characterized in that said image processing unit comprises an analog-to-digital converter for sampling an analog image signal supplied from said television camera at a first sampling frequency to produce a digital image signal representing a whole image;

a detection image extracting circuit for extracting a detection image formed by detection pixels which are derived from the whole image by sampling the digital image signal on every n-th line (n is larger than two) at a second sampling frequency which is lower than said first sampling frequency in the analog-to-digital converter;

a detection pixel memory for storing said detection pixels;

a position detecting circuit for detecting a top position of the head of the guest by comparing detection pixels of a relevant detection image and corresponding detection pixels of a previous detection image which are stored in said detection pixel memory and by detecting an occasion in which more than predetermined number of successive pixels of the relevant detection image differ from corresponding detection pixels of the previous detection image over a predetermined amount;

an address converter for determining a start address of an enlarged image in accordance with said top position of the head of the guest;

a pixel data extracting circuit for extracting pixel data of the enlarged image from the whole image in accordance with said start address;

an enlarged image memory for storing the extracted pixel data of the enlarged image;

a reproduction circuit for reading the pixel data of the enlarged image out of said enlarged image memory;

an interpolation circuit for interpolating the pixel data of the enlarged image to produce an interpolated pixel data of the enlarged image; and a digital-to-analog converter for converting the interpolated pixel data of the enlarged image into an analog image signal of the enlarged image.

The present invention is based on the recognition that the head of the guest is liable to move on the background which is substantially stationary, so that the position of the head of the guest can be detected by detecting the movement between different fields which are separated from each other over several fields, while the movement between successive fields is relatively small.

BRIEF DESCRIPTION OF THE DRAWINGS

FIG. 1 is a block diagram showing an embodiment of the television doorphone apparatus according to the invention;

FIG. 2 is a schematic view explaining the operation of the television doorphone apparatus shown in FIG. 1;

FIG. 3 is a schematic view depicting the operations to be carried out in successive fields;

FIG. 4 is a flow chart representing the operation for extracting the enlarged image in the apparatus of FIG. 1;

FIG. 5 is a schematic view illustrating the operation for finding a top of a head of a guest;

FIG. 6 is a schematic view showing the operation for compressing the pixel data of the enlarged image;

FIG. 7 is a schematic view depicting the content of the memory for storing the compressed pixel data of the enlarged image; and FIGS. 8A and 8B are schematic views illustrating the contents of the memories for storing the non-interpolated and interpolated pixel data of the enlarged image.

DESCRIPTION OF THE PREFERRED EMBODIMENTS

FIG. 1 is a block diagram showing the construction of an embodiment of the television doorphone apparatus according to the invention. A small television camera TV is provided on an outer wall of an entrance of a house. Usually, the television camera TV is formed by a CCD television camera, in which 480 pixels are arranged in the horizontal direction and 256 pixels are aligned in the vertical direction. A monitor MT is provided at a suitable position within the house. In the present embodiment, the monitor MT has a display screen composed of 480 (horizontal direction)×256 pixels(vertical direction). An image signal processing unit IPU comprises A/D converter 11, D/A converter 12, control unit CU, memory unit MU and enlarged image generating unit EIGU. The control unit CU and enlarged image generating unit EIGU are formed by a gate array 13 which performs the image processing by the hardware, so that the whole apparatus can be manufactured at a low cost. The control unit CU comprises a timing control signal generating circuit 14, an address generating circuit 15 and a memory address timing circuit 16. The memory unit MU includes a detection pixel memory 17 for storing detection pixel data which is used to detect a top of a head of a guest and enlarged image memories 18a and 18b for storing pixel data of enlarged images. The enlarged image generating unit EIGU comprises detection image extracting circuit 19 for extracting a detection image out of an input whole image, position detecting circuit 20 for detecting a position of a top of the head of the guest, address converter 21 for generating an address of a start point of an enlarged image, pixel data extracting and compressing circuit 22, reproduction circuit 23 for reading enlarged image data out of the enlarged image memories 18a and 18b and for expanding the compressed pixel data of the enlarged image and interpolation circuit 24 for interpolating the pixel data to produce the enlarged image to be displayed on the screen of the monitor MT.

Now the operation of the television doorphone apparatus illustrated in FIG. 1 will be explained also with reference to drawings shown in FIGS. 2 to 7. FIG. 2 is a schematic view depicting various processes to be performed in various fields in the television doorphone apparatus shown in FIG. 1, and FIG. 3 is a schematic view showing the operations allotted in successive fields. FIG. 4 is a flow chart representing steps in the operation for generating the enlarged image, FIG. 5 is a schematic view for explaining the manner of detecting a top position of a head of a guest, FIG. 6 is a schematic view showing the manner of compressing, storing and expanding the pixel data of the extracted enlarged image, and FIG. 7 is the schematic view illustrating the contents of the compressed pixel data of the enlarged image stored in the enlarged image memory.

When the guest operates a push button provided on the outer wall of the entrance, the television doorphone apparatus is actuated. Then, an image of the guest who is standing in front of the television camera TV is picked-up by the television camera and an image signal is supplied from the television camera to an input terminal 25 of the image processing unit IPU. Then, the image signal is supplied to the A/D converter 11 as well as to the timing control signal generating circuit 14 of the control unit CU. The timing control signal generating circuit 14 sends a timing control signal to the address generating circuit 15 which then produces various addresses such as basic address, sub-address for detecting the enlarged image and write-in address, which will be explained later. An output digital image signal generated by the A/D converter 11 represents a group of pixel data which has been sampled at a sampling frequency of 8 MHz. In the present embodiment, the image signal is sampled such that each of the digital pixel data has six bits. In FIG. 2, the image picked-up by the television camera TV is represented as a whole image A at a left upper corner. This whole image A is composed of 480×256 pixels which is defined by the construction of the solid state image sensor of the television camera TV. It should be noted that pixels aligned in the horizontal direction forms a line and thus there are 256 lines in the whole image A. Each respective pixels can be denoted by the basic address produced by the address generating circuit 15.

Now the operation in (n+1)th field shown in FIG. 3 will be explained. In this field, an operation for reading the enlarged image out of the memory 18a or 18b and an operation for detecting a top position of the head of the guest are carried out in a time division mode. The former operation A is termed as a read-out cycle RD and the latter operation is called a detection cycle DET. FIG. 3 is a flow chart expressing successive steps in the detection cycle. The digital image signal generated by the A/D converter 11 is supplied to the detection image extracting circuit 19 of the enlarged image generating unit EIGU. In the detection image extracting circuit 19, every 16th lines in the whole image A are extracted to derive 16 lines (256÷16=16). In this specification, the thus extracted lines are called detection lines. In each detection lines, the image signal is sampled at a detection sampling frequency of 2 MHz to extract 120 pixels (480×2/8=120). That is to say, every fourth pixels in respective detection lines are extracted. In the present specification, the thus extracted pixels are called detection pixels. In this manner, a detection image D composed of the sixteen detection lines each of which inlcudes 120 detection pixels can be extracted as illustrated in FIG. 2.

Then, the thus extracted detection image D is supplied to the position detecting circuit 20. In the detection pixel memory 17, there have been stored detection pixels of a previous detection image which has been extracted in the last detection cycle DET in (n−5)th field. The detection pixels of the previous detection image stored in the detection pixel memory 17 are read out of the memory under the control of a memory address produced by the memory address generating circuit 16 which is controlled by the sub-address generated by the address generating circuit 15 and a timing control signal generated by the timing control signal generating circuit 14. The thus read-out detection pixels are supplied to the position detecting circuit 20. At first, 120 detection pixels in the first detection line of the relevant detection image D are compared with corresponding 120 detection pixels in the first detection line of the previous detection image. Then, the number of successive detection pixels in the first detection line of the relevant detection image which are different from corresponding detection pixels in the first line of the previous detection image by a predetermined amount is detected. Then, the thus detected number of pixels is compared with a predetermined number. In the present embodiment, said predetermined number is set to four. When the detected number of successive detection pixels is smaller than four, the 120 detection pixels in the first line of the relevant detection image are stored in the detection pixel memory 17 instead of the corresponding detection pixels of the previous detection image. Then, the detection pixels in the second detection line of the relevant detection image D are compared with corresponding detection pixels in the second line of the previous detection image stored in the detection pixel memory 17. When more than four successive pixels of the relevant detection image do not differ from corresponding detection pixels of the previous detection image over the predetermined amount, the 120 detection pixels of the relevant detection image are stored in the detection pixel memory 17 instead of the corresponding detection pixels of the previous detection image. In this manner, successive detection lines of the relevant detection image are compared with corresponding detection lines of the previous detection image.

It is now assumed that in the eighth detection line of the detection image, more than four successive detection pixels differ from corresponding detection pixels in the eighth detection line of the previous detection image by the predetermined amount. Then, the position detecting circuit 20 detects a position of the fourth detection pixel of these detection pixels which are different from the corresponding pixels in the previous detection image. As illustrated in FIG. 5, the position of 78th detection pixel in the 8th detection line is detected. As shown in FIG. 5, the detection image is divided into 15 sections in the horizontal direction, and the position of 78th detection pixel situates in the tenth section. The left-hand extreme position of the tenth section, i.e. a position of 72nd detection pixel is detected as a position H at which a top of the head of the guest is situated. The inventors have experimentally confirmed that said predetermined number is preferably set to four to twelve when the television camera TV has the angle of view of 120 degrees. When the predetermined number is set smaller than four, the top of the head could not be detected correctly due to the noise, and when the predetermined number is set larger than twelve, it is difficult to detect the position of the head of the guest.

The position H detected in the manner explained above is then supplied to the address converter 21. Then, the address converter 21 generates a start address (left upper corner point) of an enlarged image L in the whole image A such that the enlarged image L includes the head of the guest. In the present embodiment, the enlarged image L to be displayed on the monitor MT has a size of 240×128 pixels which is a fourth of the size of the whole image A. In the present embodiment, the address of the detected position H is 72nd detection pixel and 8th detection line on the detection image D, so that the start address S of the enlarged image L on the whole image is determined by the following calculations:

$$\text{pixel number} = 72 \times 4 - 120 = 168$$

$$\text{line number} = 8 \times 16 - 32 = 96$$

When the pixel number and the line number become negative, they are set to zero.

These equations means that the top position of the head of the guest has to be situated at a center of the enlarged image viewed in the horizontal direction and at an upper quarter position viewed in the vertical direction. In this manner, the start address of the enlarged image L is set to 168th pixel and 96th line on the basic address.

After the position H has been detected by the position detecting circuit 20, the detection pixels in the succeeding detection lines, i.e. from 9th detection line to 16th detection line are stored in the detection pixel memory 17. When all the detection pixels in the first to sixteenth detection lines of the relevant detection image D have been stored in the detection pixel memory 17, the field detection cycle DET in the (n+1)th field shown in FIG. 2 is completed.

Next the operation of the writing cycles WR which occur at every other fields will be explained. In the writing cycle WR of (n+2)th field, the pixel data of the enlarged image L is read out of the whole image A of 480 pixels×256 lines picked-up in the relevant field, and then pixel data of the extracted image is compressed and is stored in either one of the enlarged image memories 18a and 18b.

That is to say, in accordance with the start address S of the enlarged image L detected in the detection field DET, pixels in the enlarged image L are successively read out. The thus read out pixel data of the enlarged image L is compressed by the pixel data compressing circuit 22 as depicted in FIG. 6. The pixel data $a_1$ of a first pixel of the whole image A is composed of six bits and is compressed into four bit data $A_0$ to $A_3$. The thus compressed pixel data $A_0$ to $A_3$ is stored at an address position in the enlarged image memory 18a. Next, a second pixel data $a_2$ of the enlarged image L is read out and is compressed into pixel data $A_4$ to $A_7$. The thus compressed pixel data $A_4$ to $A_7$ is stored in the enlarged image memory 18a at the same address position as the compressed data $A_0$ to $A_3$. Since the enlarged image L has 240 pixels in the horizontal direction, after 408th pixel (168+240) has been stored in the enlarged image memory 18a, pixel data in the second line of the enlarged image L is read out and stored in the enlarged image memory 18a after being compressed. In this manner, pixel data in successive lines of the enlarged image L is compressed and is stored in the enlarged image memory 18a. Since the enlarged image L has 128 lines in the vertical direction, after 356th pixel in 223rd line of the whole image A has been stored in the memory 25 after being compressed, the relevant writing cycle WR is completed. The pixel data of a next enlarged image will be processed in the same manner in a next writing cycle WR in (n+4)th field and the compressed pixel data will be stored in the enlarged image memory 18b. In this manner, sets of the compressed pixel data of the enlarged image L obtained in the successive writing cycle WR are alternately stored in the enlarged image memories 18a and 18b.

Now the operation in the reading cycle RD which occurs in every fields will be explained.

In (n+2)th field in FIG. 3, the compressed pixel data of the enlarged image L obtained in the writing cycle WR is stored in the enlarged image memory 18a. In next (n+3)th field, the compressed pixel data stored in this memory 18a is read out by the reproduction circuit 23. In the enlarged image memory 18a, the compressed pixel data of the enlarged image L is stored as illustrated in FIG. 7. That is to say, in a first address position (0, 0) there are stored two sets of compressed pixel data $a_1'$ ($A_0$-$A_3$) and $a_2'$ ($A_4$-$A_7$), in a second address position (1, 0), there are stored two sets of the compressed pixel data $a_3'$ and $a_4'$, and so on. These sets of the compressed pixel data $a_1'$, $a_2'$, $a_3'$, $a_4'$— are read successively out of the enlarged image memory 18a and are expanded, while the number of the lines is increased by two by reading the pixel data on the same line twice. In other words, the reproduction circuit 23 performs a kind of the interpolation in the vertical direction. That is to say, the pixel data on the first line in the memory 18a is read out for first and second lines of the enlarged image to be displayed, the pixel data on the second line in the memory 18a is also read out twice for third and fourth lines of the enlarged image, and so on. The expansion can be performed by effecting the compression in the reverse manner.

For the sake of simplicity, it is now assumed that a display image is composed of only the thus read out and interpolated pixel data. Then, there will be obtained an image shown in FIG. 8A. Since the enlarged image L has 240 pixels in the horizontal direction, it is necessary to create 240 pixels in each lines from the read out 240 pixels in each lines by means of the interpolation circuit 24. That is to say, expanded pixel data $a_{12}$, $a_{23}$, $a_{34}$— at an intermediate position between successive pixels is derived as an average of the pixel data of these successive pixels. That is to say, $a_{12}=(a_1+a_2)/2$. In this manner, one field of the interpolated enlarged image E having 240 pixels in each of 128 lines can be obtained as illustrated in FIG. 8B. The digital pixel data generated by the interpolation circuit 24 is then supplied to the D/A converter 12 and is converted to the analog image signal, which is then supplied to the monitor MT. In this manner, on the display screen of the monitor MT, there is displayed the interpolated enlarged image E of the head of the guest. As stated above, this interpolated enlarged image E has 480 pixels in the horizontal direction and 256 lines in the vertical direction. According to the invention, the interpolated enlarged image E is extracted from the whole image A on the basis of the position H of the top of the head of the guest, and therefore the head of the guest is always displayed at the center of the display screen of the monitor MT.

In the reading cycle RD in (n+4)th field, the compressed pixel data is again read out of the enlarged image memory 18a and the same interpolated enlarged image L is displayed on the monitor MT. In the writing cycle WR in this (n+4)th field, compressed pixel data of an enlarged image L extracted from a whole image A picked-up in the relevant field in accordance with the same start address S is written in the enlarged image memory 18b. In (n+5)th and (n+6)th fields, the compressed pixel data is read out of the enlarged image memory 18b. In the writing cycle WR in (n+6)th field, compressed pixel data of an enlarged image L extracted from a whole image A picked-up in this field on the basis of the same start address S is written in the enlarged image memory 18a.

In the present embodiment, the control unit CU and enlarged image generating unit EIGU are formed by the gate array 13, but these units may be formed by CPU, in which the above explained operations will be performed by a software.

In the above embodiment, the enlarged image is formed by extracting the detection pixels in every sixth lines, which is synchronized with the frequency of the commercially available electric power supply, so that the influence of the flicker of fluorescent lamps can be avoided.

As explained above in detail, in the television doorphone apparatus according to the invention, even if the head of the guest does not situate at the center position of the field of view of the television camera due to various factors such as the height of the guest and the standing position of the guest with respect to the television camera, on the monitor screen the image of the head of the guest is always displayed at the center of the monitor screen. Therefore, it is not necessary to adjust the field of view of the television camera upon providing the television camera on the outer wall of the entrance. Further, the position of the top of the head of the guest can be detected by processing a smaller number of detection pixels which are extracted from the input whole image, the capacity of the memories can be made very small, and the image processing can be performed within a short time period.

What is claimed is:

1. A method of automatically adjusting a field of view of a television monitor system including a television camera for picking up an image of an object to generate an image signal representing a whole image, an image processing unit for processing the image signal generated by the television camera to produce a processed image signal, and a monitor for receiving the processed image signal and displaying the image of the object on a monitor screen, comprising the steps of:

extracting detection pixels which represent a detection image, from said whole image by sampling the image signal on every n-th line (n is larger than two);

storing said detection pixels in a direction pixel memory;

comparing detection pixels of a current detection image and corresponding detection pixels of a previous detection image which are stored in said detection pixel memory;

detecting an occurrence in which more than a predetermined number of successive pixels of the current detection image differ from corresponding detection pixels of the previous detection image over a predetermined amount to detect a position of a center top of the image of the object; and generating a start address of an enlarged image in accordance with said position of the center top of the object.

2. A method according to claim 1, wherein said image signal generated by the television camera is converted into a digital image signal by sampling the image signal at a first sampling frequency, and said detection pixels are extracted from the whole image by sampling the digital image signal at a second sampling frequency which is lower than said first sampling frequency.

3. A method according to claim 2, wherein said first sampling frequency is set to 8 MHz, said second sampling frequency is set to 2 MHz.

4. A method according to claim 1, wherein said step of detecting the center top of the object comprises the steps of:

comparing the detection pixels of the current detection image with corresponding detection pixels of the previous detection image to detect detection pixels which differ from the corresponding detection pixels over said predetermined amount;

counting the number of successive detection pixels of the current detection image which differ from the corresponding detection pixels of the previous detection image;

comparing said number of successive detection pixels of the current detection image with said predetermined number; and detecting a position of predetermined one of said successive detection pixels on the detection image.

5. A method according to claim 4, wherein said predetermined number is set to a value between 4 and 12.

6. A method according to claim 5, wherein said start address generating step comprises the steps of:

deriving an address of said position of predetermined one of said successive detection pixels on the detection image; and deriving said start address of the enlarged image such that said address of the position of predetermined one of said successive detection pixels is substantially situated at a center viewed in the horizontal direction and at an upper quarter position viewed in the vertical direction.

7. A television apparatus comprising a television camera for picking up an image of a person who stands in front of the television camera and generating an image signal, an image processing unit for processing the image signal generated by the television camera to produce a processed image signal and displaying the image of the person on a monitor screen, the improvement being characterized in that said image processing unit comprises an analog-to-digital converter for sampling an analog image signal supplied from said television camera at a first sampling frequency to produce a digital image signal representing a whole image;

a detection image extracting circuit for extracting a detection image formed by detection pixels which are derived from the whole image by sampling the digital image signal on every n-th line (n is larger than two) at a second sampling frequency which is lower than said first sampling frequency in the analog-to-digital converter;

a detection pixel memory for storing said detection pixels;

a position detecting circuit for detecting a top position of the head of the person by comparing detection pixels of a current detection image and corresponding detection pixels of a previous detection image which are stored in said detection pixel memory and by detecting an occurrence in which more than predetermined number of successive pixels of the current detection image differ from corresponding detection pixels of the previous detection image over a predetermined amount;

an address converter for determining a start address of an enlarged image in accordance with said top position of the head of the person;

a pixel data extracting circuit for extracting pixel data of the enlarged image from the whole image in accordance with said start address;

an enlarged image memory for storing the extracted pixel data of the enlarged image;

a reproduction circuit for reading the pixel data of the enlarged image out of said enlarged image memory;

an interpolation circuit for interpolating the pixel data of the enlarged image to produce an interpolated pixel data of the enlarged image; and a digital-to-analog converter for converting the interpolated pixel data of the enlarged image into an analog image signal of the enlarged image.

8. Apparatus according to claim 7, wherein said analog-to-digital converter samples the analog image signal at the first sampling frequency of 8 MHz and said detection pixel extracting circuit samples the digital image signal at the second sampling frequency of 2 MHz.

9. Apparatus according to claim 8, wherein said television camera generates the analog image signal having 256 lines each having 480 pixels, and said detection image extracting circuit is constructed to extract every sixteenth lines of the whole image.

10. Apparatus according to claim 9, wherein said position detecting circuit is constructed such that the detection pixels of the current detection image are compared with corresponding detection pixels of the previous detection image to detect detection pixels which differ from the corresponding detection pixels which differ from the corresponding detection pixels over said predetermined amount, the number of successive detection pixels of the current detection image which differ from the corresponding detection pixels of the previous detection image is counted, said number of successive detection pixels of the current detection image is compared with said predetermined number, and a position of predetermined one of said successive detection pixels is detected on the detection image.

11. Apparatus according to claim 10, said predetermined number is set to a value between 4 to 12.

12. Apparatus according to claim 9, wherein said address converter is constructed such that an address of said position of predetermined one of said successive detection pixels is detected on the detection image, and said start address of the enlarged image is derived such that said address of the position of predetermined one of said successive detection pixels is substantially situated at a center viewed in the horizontal direction and at an upper quarter position viewed in the vertical direction.

13. Apparatus according to claim 9, wherein said enlarged image extracting circuit is constructed such that the enlarged image composed of 128 lines each having 240 pixels is extracted, and pixel data of the thus extracted enlarged image is compressed.

14. Apparatus according to claim 13, further comprising a reproduction circuit for reading the compressed pixel data of the extracted enlarged image out of said enlarged image memory and for expanding the compressed pixel data read out of the enlarged image memory.

15. Apparatus according to claim 14, wherein said reproduction circuit is constructed such that each of the lines of the enlarged image is read out twice to increase the number of lines of the enlarged image twice.

16. Apparatus according to claim 15, wherein said interpolation circuit is constructed such that the number of pixels in each lines is increased twice by interpolating pixels between successive pixels of the enlarged image.

* * * * *